United States Patent [19]
Richardson, Jr.

[11] Patent Number: 5,692,459
[45] Date of Patent: *Dec. 2, 1997

[54] POLLUTION-FREE VEHICLE OPERATION

[76] Inventor: William H. Richardson, Jr., 1496 Giles St., Palm Bay, Fla. 32907

[*] Notice: The term of this patent shall not extend beyond the expiration date of Pat. No. 5,435,274.

[21] Appl. No.: 329,983

[22] Filed: Oct. 27, 1994

Related U.S. Application Data

[63] Continuation-in-part of Ser. No. 253,346, Jun. 3, 1994, abandoned, Ser. No. 162,342, Dec. 2, 1993, Pat. No. 5,435,274, and Ser. No. 854,938, Mar. 20, 1992, which is a continuation-in-part of Ser. No. 613,094, Nov. 15, 1990, abandoned.

[51] Int. Cl.$^6$ ............................................. F02B 43/08
[52] U.S. Cl. ................................. 123/3; 123/DIG. 12
[58] Field of Search ............................ 123/525, 527, 123/DIG. 12, 3

[56] References Cited

U.S. PATENT DOCUMENTS

| | | | |
|---|---|---|---|
| 3,650,345 | 3/1972 | Yardney | 180/65 A |
| 4,003,344 | 1/1977 | Bradley | 123/3 |
| 4,168,685 | 9/1979 | Little | 123/527 |
| 4,335,429 | 6/1982 | Kawakatsu | 364/424 |
| 5,159,900 | 11/1992 | Dammann | 123/3 |
| 5,435,274 | 7/1995 | Richardson, Jr. | 123/3 |

*Primary Examiner*—Erick R. Solis
*Attorney, Agent, or Firm*—Charles A. McClure

[57] ABSTRACT

Operation of mechanically or electrically driven vehicles, whether suitable for air, land, or sea transport, substantially pollution-free by operating their internal-combustion engines on a leak-resistant fuel gas derived by pyrolysis of carbon and water.

18 Claims, 3 Drawing Sheets

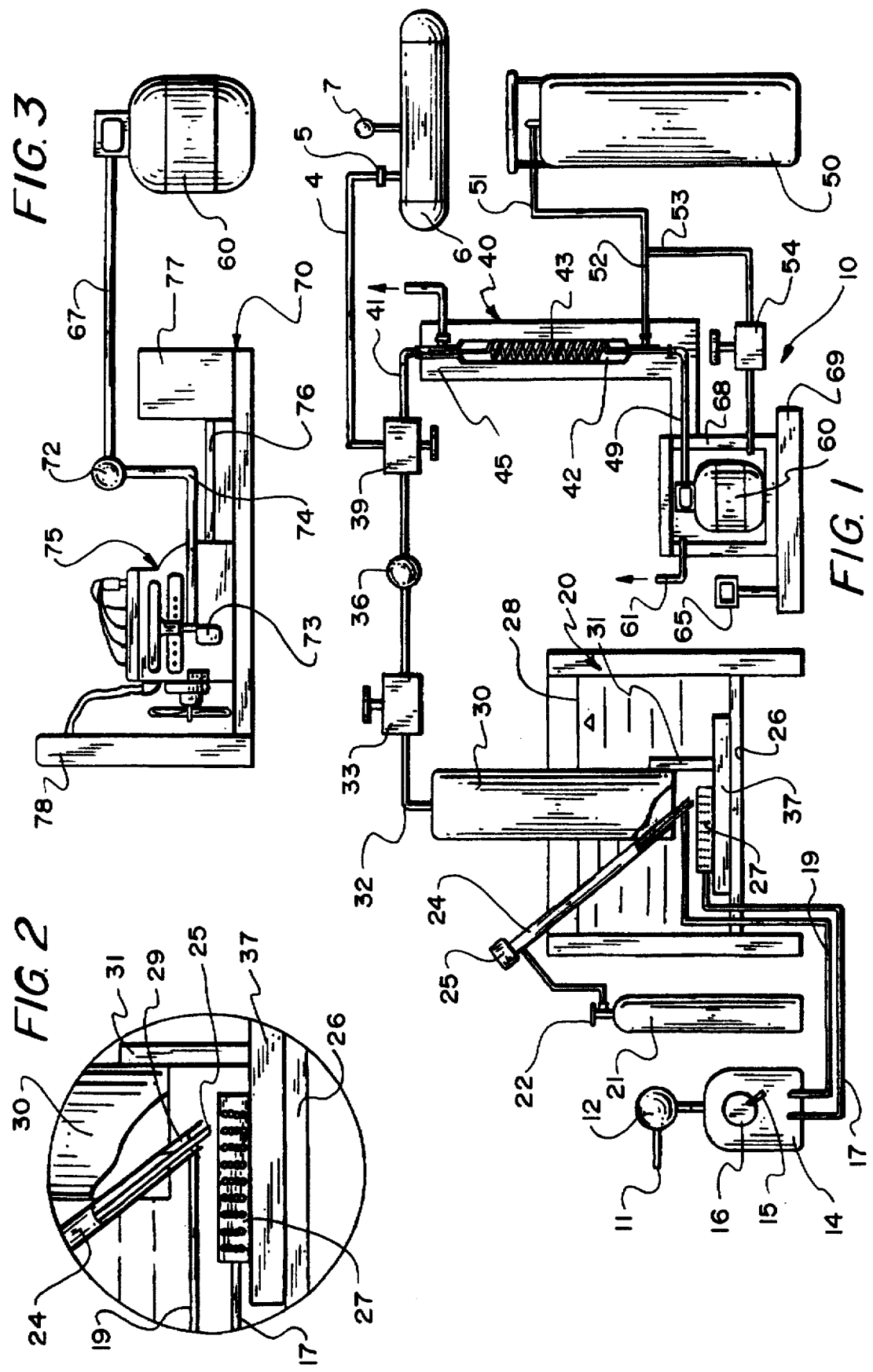

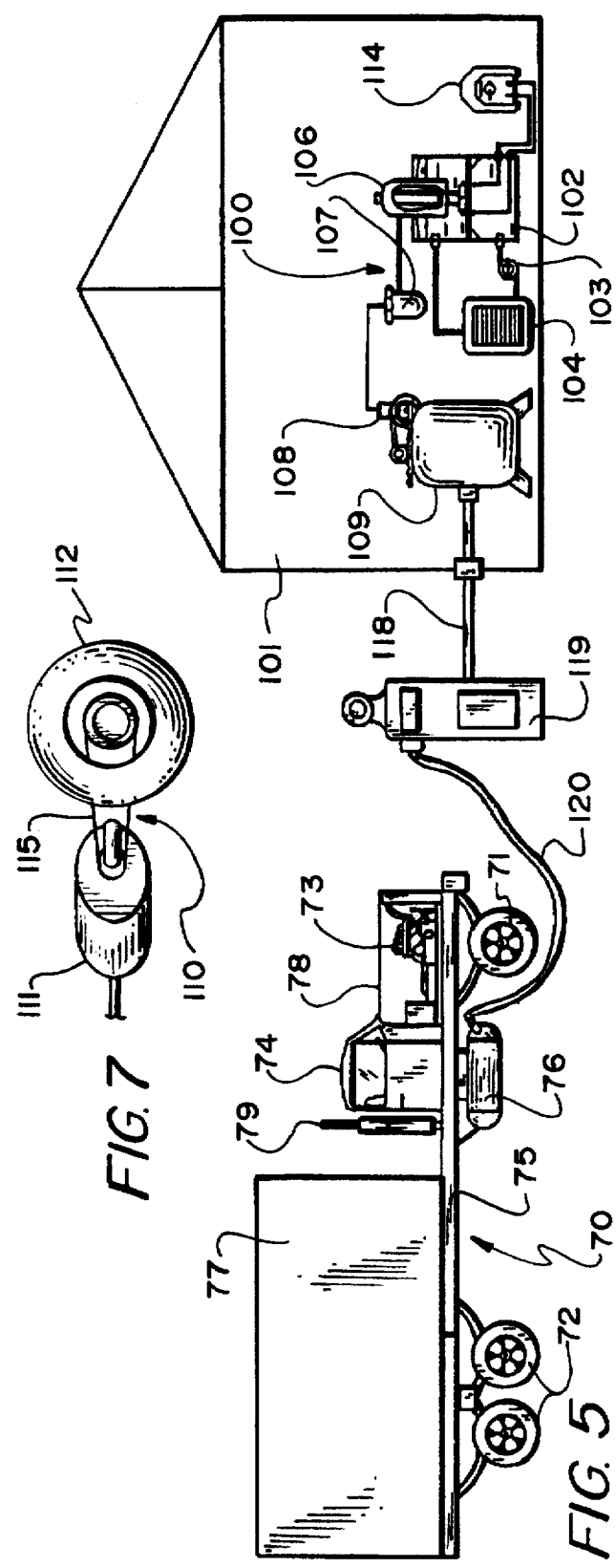
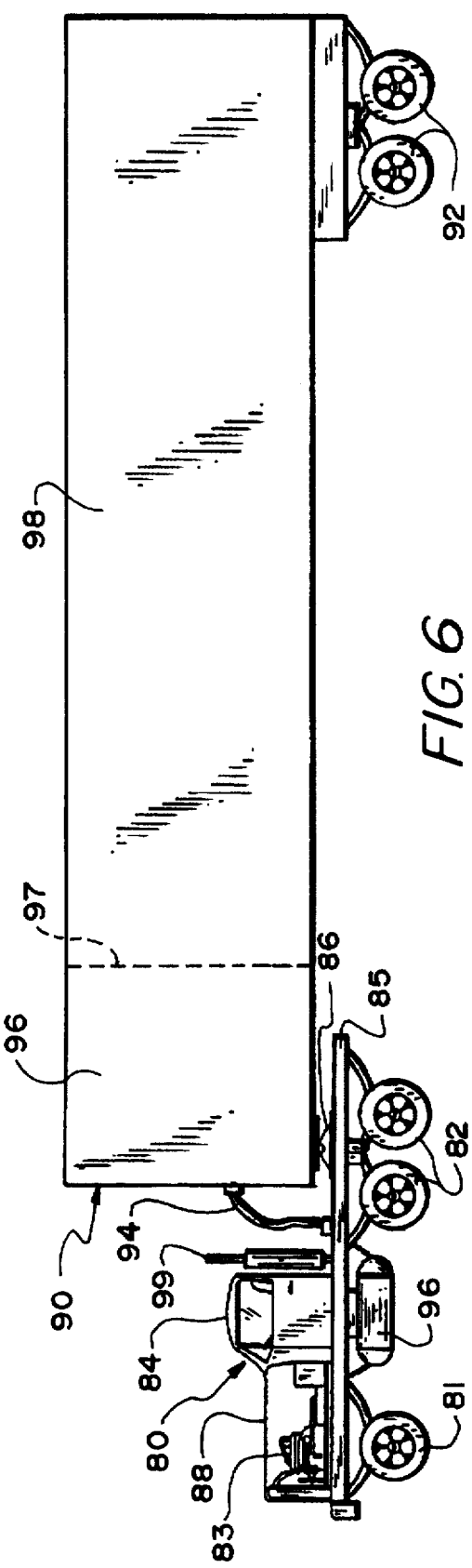

POLLUTION-FREE VEHICLE OPERATION

This is a continuation-in-part of my applications: U.S. Ser. No. 08/253,346 filed 3 Jun. 1994 now abandoned; U.S. Ser. No. 08/162,342 filed 2 Dec. 1993 now U.S. Pat. No. 5,435,274; and U.S. Ser. No. 07/854,938 filed 20 Mar. 1992—the last mentioned application being a continuation-in-part of my then application Ser. No. 07/613,094 filed 15 Nov. 1990, now abandoned.

TECHNICAL FIELD

This invention relates to motor vehicles powered by combustion engines and operable substantially pollution-free on given fuel gas.

BACKGROUND OF THE INVENTION

Fossil fuels, such as coal, petroleum (including diesel oil, kerosene, jet fuel, and gasoline), and even natural gas, are burned for many purposes. Their combustion effluents contain, in addition to the customary carbon dioxide and water, undesirable materials, such as hydrocarbon fragments and derivatives, often in particulate form, carbon monoxide, and gaseous oxides of nitrogen and/or of sulfur transformable to noxious droplet form (acid rain).

Hydrogen, long considered prospectively an ideal fuel because convertible completely to water in air combustion, is unsatisfactory as fuel for internal-combustion engines because it heats the intake valves until pre-ignition flashback occurs, ahead of the combustion chamber—not only deleterious to the engine but also conducive to emission of harmful nitrogen oxides into the atmosphere. See, for example, *HYDROGEN STORAGE AND UTILIZATION IN TRANSPORTATION VEHICLES—SUMMARY*, published by the U.S. Department of Energy, Alternative Fuels Utilization Program, Office of Transportation Systems in 1988, including citation of numerous other pertinent references.

Many large cities have become badly polluted by the emissions from combustion of fossil fuels. Significant contributors include motor vehicles, lawnmowers, heating systems, manufacturing plants, and electrical generating plants, despite many laws and safeguards for limiting harmful effluents. The increasing smog will become worse at an accelerating rate unless abatement is put into practice. My invention is the first and (so far) only solution to the problem.

SUMMARY OF THE INVENTION

A primary object of the present invention is operation of motor vehicles without pollution of the environment.

Another object of this invention is to fuel combustion in such a way that it is substantially free of harmful emissions.

A further object of the invention is to enable substantially pollution-free operation of internal-combustion engines.

Yet another object of the invention is to enable motor vehicles to provide electrical power useful in their operation.

A still further object of the invention is to render production of electrical energy for use by motor vehicles more environmentally friendly than it customarily is nowadays.

A still further object of this invention is to accomplish the foregoing objects more economically than possible with fossil fuels, preferably taking into account environmental as well as other costs.

In general, the objects of this invention are attained using fuel gas combustible substantially completely to carbon dioxide and water vapor, whether in an internal-combustion engine or otherwise.

More particularly, motor vehicles are fueled according to this invention and thereby enabled to combust the fuel pollution-free and to be driven either directly through engine-produced motive power or indirectly by electricity generated by engine-produced motive power.

In addition, this invention enables vehicles with considerable fuel requirements to produce fuel gas on board—advantageous for sea transport vessels as well as for transcontinental trucks. The fuel gas is liquefiable for convenient storage and air, land, or sea use.

The fuel gas input materials are inexpensive carbon and water. Also required is a source of electrical energy sufficient to strike an underwater arc, which is readily maintained with little energy input because of its negative temperature coefficient of resistance. Once struck, the arc is readily maintained, and requires much less energy input than is subsequently obtainable as output by combustion of the fuel gas evolved via the high-temperature (5°–6000° F.) arc.

Other objects of the present invention, together with means and methods for attaining the various objects, will become apparent from the following description and the accompanying diagrams of preferred embodiments, presented by way of example rather than limitation.

SUMMARY OF THE DRAWINGS

FIG. 1 is a schematic diagram of an exemplary embodiment of the fuel gas evolving apparatus of this invention, including compression and storage equipment, with and without liquefying the fuel gas;

FIG. 2 is a fragmentary side elevation of the carbon arc and vicinity, on an enlarged scale, in the same gas-evolving apparatus;

FIG. 3 is a schematic side elevation of an internal-combustion engine running on stored fuel gas of the invention to produce output motive power to a mechanical transmission or a electrical generator;

FIG. 5 is a schematic side elevation of a truck having its fuel tank refilled with fuel of this invention via a filling station also containing apparatus for evolving and compressing the fuel gas of this invention and for storing the fuel and dispensing it on demand;

FIG. 6 is a schematic side elevation of a tractor and hitched semi-trailer for carrying cargo (not shown) in the major part of its body aft of a bulkhead (vertical broken line) and carrying apparatus (hidden here, see preceding views) for evolving and compressing fuel of this invention within part of its body forward of the bulkhead;

FIG. 7 is a fragmentary schematic view of a driving wheel and vicinity, showing an optional electric motor drive for a FIG. 5 or 6 motor vehicle, in replacement of the conventional drive shaft from engine to a differential, and axle shafts from there to the wheel.

DESCRIPTION OF THE INVENTION

Figure 4:
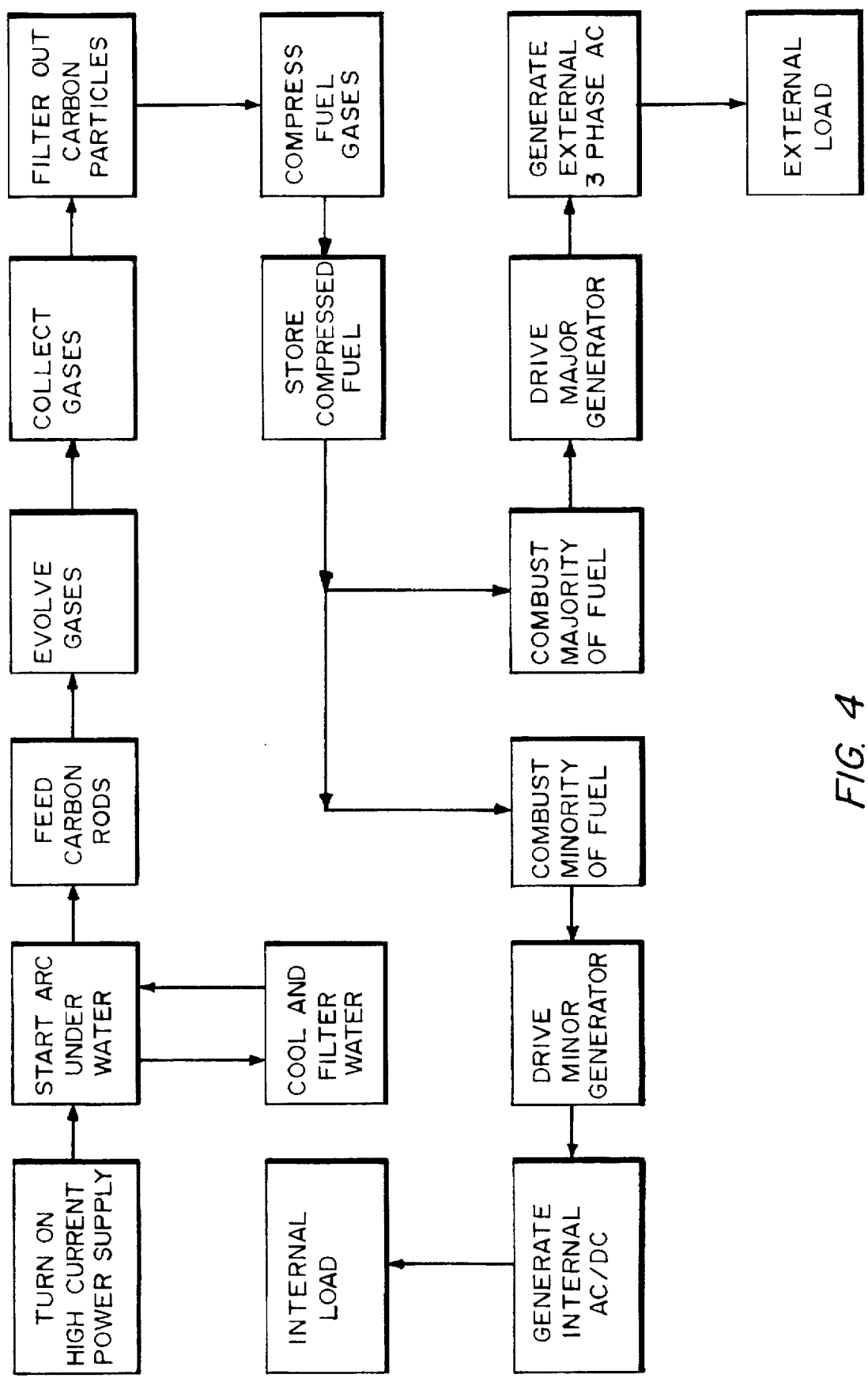
FIG. 4 is a schematic block diagram of evolving the fuel gas, compressing and storing it, combusting the fuel to generate electrical power, and feeding back some of the generated power to the input to the arc in which the fuel gas of this invention is being evolved.

FIG. 1 shows, in schematic side elevation, partly in section, an embodiment of apparatus 10 adapted to evolve, collect, compress, and liquefy fuel gas of this invention. It features, at the left, electrical meter 12 connected to an external source (not shown) of electrical power via pair of leads 11, and connected by pair of leads 13 to welder 14, with heavy-duty electrical output adjustable by setting of arm 15 on dial 16, and connected by pair of heavily insulated leads 17, 19 to respective electrodes 27, 24 in tank 20. The tank is filled with water (shaded) to level 28 near its top.

FIG. 2 shows details of part of the apparatus in tank 20 of FIG. 1 on an enlarged scale, including especially lead 17 connected to graphite block electrode 27, lying on insulating slab 27 on raised floor 26 of the tank, whereas lead 19 connects to the lower end of oblique magazine 24-partly sectioned away to show (shaded) contactor portion 29 of the magazine, fitting closely around carbon rod 25 to assure electrical contact just above its protruding lower end. Cylindrical hood 30, upright on support 31 upstanding from the bottom of tank 20, is open at its submerged bottom end in the water above the nearest approach of the magazine to the block electrode.

FIG. 1 also shows, cylinder 21 (inert flushing gas) with valve 22 connected by tubing 23 to the upper end of magazine 24, which is capable of holding at least several carbon rods and is covered by cap 25 except during loading of the rods. Fuel transport tube 32 connects the top of gas-collecting hood 30 through in-line isolation valve 33 and compression pump 39 to three-way distribution valve 39, which may be closed, open to upper branch line 4, or open to lower branch line 41. The upper branch line leads from the distribution valve to coupling 5 of fuel gas storage container 6 having pressure valve 7 thereon. Successive containers may be connected to the line for filling, and be disconnected therefrom for storage when filled.

Lower branch line 41 from distribution valve 39 leads to the top of condenser 40 inside insulating jacket 45, where it connects to the top end of helical condenser tube 43, whose bottom end connects via outlet tube 49 to (liquid fuel) container 60. The helical tube is surrounded by condenser jacket 42, which has vent tube 41 at its upper end and is supplied at its lower end with coolant from tank 50 (valve not shown) via tube 51 and branch tube 52. Branch tube 53, when its valve 54 is open, feeds coolant around container 60 in insulated box 68, with vent 61 and cover 62, on balance base 69 with scale 65—for weight of the container and its contents.

FIG. 3 shows internal-combustion engine apparatus 70, with cooling radiator at the left. Engine 75 is fed with fuel gas boiling off from container 60 via outlet tube 67 through valve 72 and to the engine intake via tube 74. Air reaches the engine from the atmosphere via adjacent adapter or butterfly valve 73. Drive shaft 76 connects engine motive output to gearbox or electrical generator 77.

It will be understood that motor vehicles, such as automobiles, locomotives, tractors, and trucks, may be operated by application of conventional motive output from a combustion engine to their driving wheels, or alternatively may be operated by application of motive output to electrical generating equipment whose electrical output operates motors mechanically connected to such vehicle drive wheels.

Aircraft and watercraft may be propelled similarly, directly by motive output from a combustion engine or by equivalent electrical driving of propeller or screw means (drive wheel analogues). Not only may ships burn the fuel gas of this invention in the combustion chambers of steam boilers or in formerly diesel-fueled engines, but aircraft also may run on this fuel instead of jet fuel or gasoline.

FIG. 4 shows, in block form, a flow diagram of steps that take place in the practice of this invention. The fuel generation steps predominate in the upper part of the view. The fuel conversion and power generation steps predominate in the lower part of the view.

Sequential steps in the fuel generation part of this invention include (1) TURN ON HIGH CURRENT POWER SUPPLY, (2) START ARC UNDER WATER, (3) FEED CARBON RODS, (4) EVOLVE GASES, (5) COLLECT GASES, (6) FILTER OUT CARBON PARTICLES, (7) COMPRESS FUEL GASES, and (8) STORE COMPRESSED FUEL. The last two mentioned steps are performed upon the evolved fuel gas, presumably a mixture or other aggregation of gases. Accessory composite steps (9) COOL AND FILTER WATER maintain water conditions as desired, especially at the hot underwater arc locus of gas evolution-from which evolved gases bubble up through the intervening water, heating it, and into the overlying hood, to be collected and stored for fuel use as indicated.

Sequential steps in the center of FIG. 4 include arrows and lines from the Store Compressed Fuel step downward to the lower part of the view, and a pair of symmetrically located steps, (16) COMBUST MINORITY OF FUEL (at left) and—at right—(11) COMBUST MAJORITY OF FUEL. Succeeding the latter step are the sequential steps of (12) DRIVE MAJOR GENERATOR, (13) GENERATE EXTERNAL 3ø AC. A final arrow on the right terminates at (14) EXTERNAL LOADS. To the left from the step (15) COMBUST MINORITY OF FUEL are the sequential steps of (16) DRIVE MINOR GENERATOR and (17) GENERATE INTERNAL AC/DC terminating at (18) INTERNAL LOADS.

FIG. 5 shows, in schematic side elevation, a filling station (at right) providing fuel of this invention to truck 70 (at left). The truck has cab 74 and engine compartment 78 forward, and cargo compartment 77 aft, on flat bed 75 supported via springs on pair of front wheels 71 and two pairs of rear drive wheels 72 connected by suitable means (not shown) to engine 73, whose muffler and exhaust pipe 79 are upright behind the cab. Fuel tank 76 is slung underneath the bed below the cab with fuel line (hidden) to the engine.

Filling station building 101 houses embodiment 100 of apparatus for evolving, collecting, and compressing fuel gas according to this invention, including electric welder 114, water tank 102, electrodes (not noted) circulating pump 103, and water-cooling heat-exchanger 104. Gas-collecting hood 106 is connected in turn to particulate (in-line) filter 107, compressor 108, and storage tank 109. Fuel delivery line 118 connects the stored fuel to metering pump 119, and fuel filling line 120 connects in turn to truck fuel compartment 76.

No attempt is made in FIG. 5 or FIG. 6 to show connection of engine motive output to the drive wheels, as by conventional drive shaft, differential, and axle shaft, or instead—as noted below—by electrical connection, from an added generator run by the engine, to electric motors connected mechanically to the wheels to drive them.

FIG. 6 shows semi-trailer 90 connected at its front end to tractor 80, by hitch 86 on flat bed 85 of the tractor, and supported at its rear end by a double pair of wheels 92. The tractor resembles the front end and undercarriage of the truck of the preceding view in having cab 84 and engine compartment 88 forward on flat bed 85. The bed is supported via springs on pair of front wheels 81 and twin pairs of rear drive wheels 82 connected by means (not shown here) to engine 83, with fuel compartment 86 slung underneath. The trailer, supported at its front end by the tractor, has lateral bulkhead 97 (broken line) dividing it into large rear cargo compartment 98 and small forward on-board fuel-manufacturing compartment 96, containing fuel evolving, collecting, compressing, and storage means of this invention, such as shown to some extent in the filling station, or in modified detail in FIG. 1. Fuel-manufacturing compartment 96, shown at about one-fifth of the trailer length, may be more compact.

FIG. 7 shows electric drive arrangement 110, wherein motor 111 connects by drive belt 115 to drive wheel 112, which otherwise would be driven by conventional mechanical connection from the engine. The motor is a FIG. 4 external load operable by FIG. 3 generator 77.

How to make, store, and use the fuel of the present invention is readily apparent from this description and accompanying diagrams. However, what happens in the electrical arc is not well understood, and need not be understood in order to practice this invention. To the extent that this specification suggests what occurs in or as a consequence of the arc, or interprets decomposition, recombination, or combustion processes, or suggests why the resulting fuel gas has or lacks certain characteristics or certain compositions, that text should be understood as being academic, speculative, or theoretical. In contrast, operational features of this invention, sufficient to enable its practice by persons of at least ordinary skill in the relevant arts, are specified here and are readily understandable.

High-temperature arcing occurs—even under water—when adequate electrical potential (AC or preferably DC) is applied across a pair of electrodes, here preferably composed substantially of graphite. Presumably, pyrolysis ensues, and some surrounding water dissociates into its component hydrogen and oxygen; also some carbon vaporizes. Some of the carbon oxidizes to carbon monoxide, and some of the carbon and/or some of the carbon monoxide oxidizes to carbon dioxide. If the electrodes are less wetted than when immersed in excess water the predominant carbon oxide will be dioxide rather than monoxide. If the electrodes are non-carbonaceous, the essential carbon must be introduced into the arc in rod, particulate, or other suitable form. Presumably, combination of carbon with hydrogen is less likely than with oxygen, whereupon most (if not all) of the hydrogen dissociated from water is present in the form of molecular hydrogen. The gas has (at most) only a faint odor, suggesting minimal organic content, with perhaps trace(s) of ethylenic and/or acetylenic hydrocarbon(s).

The water to be decomposed in the process of this invention is not subject to any unusual requirement. Most water sources prove satisfactory, including brackish or salt—as well as fresh—water, but water polluted with petroleum or the like should be avoided.

The fuel gas of this invention appears to have leak-resistant capability because it diffuses through semipermeable membranes more slowly than its presumed component compositions do. Comparative testing in balloons of elastomeric material often filled with air or perhaps helium reveal this remarkable property. Whereas a hydrogen-filled balloon will deflate by diffusion of the gas through its wall in a matter of several hours or so, and identical balloons filled with air or carbon oxides deflate likewise in several days or so, an identical balloon filled with the fuel gas of this invention will not deflate fully for at least about several weeks—namely, an order of magnitude (ten times) as long or as slow as air for example, or two orders of magnitude (a hundred times) as long or as slow as hydrogen. Indeed, balloons filled with fuel gas produced by this invention have not fully deflated in a half year—yet another order of magnitude as long (or as slow). This remarkable capability may even compensate to some extent for an incompletely seated valve.

Chemical and physical analyses of this fuel gas have failed to account for its apparent leak-resistant property. Speculation about possible presence of gaseous polymers, fullerenes, etc. has ensued. As already indicated, structural explanations of properties are not essential to production and use of the fuel gas of this invention.

The fuel gas so evolved and collected according to the present invention appears, from physical and chemical analyses, to comprise (by volume) gaseous hydrogen in major amount, as from about four to about seven eighths, carbon monoxide in predominant minor amount, as from about two to about four eighths, and lesser amounts of other gases, such as carbon dioxide, hydrocarbons (or other organics), nitrogen, or oxygen—the latter in concentration insufficient for self-combustion. A representative sample might be about five-tenths hydrogen, three-tenths carbon monoxide, and the rest other gases.

This fuel gas burns evenly with substantially clear flame and no sooting upon adequate access to air (about a half dozen times the fuel volume). It can fuel an internal combustion engine without a carburetor or injection nozzle. Conversion to this gaseous fuel may be facilitated by use of a gas fuel adapter. Suitable adapters are available from Garretson Equipment Co., Inc., Mt. Pleasant, Iowa. Also note Garretson U.S. Pat. Nos. 3,974,851; 4,375,798; 4,829,957.

This fuel gas burns easily and evenly, with adequate access to air (about a half dozen times the fuel volume), and can operate an internal combustion engine without carburetor or injection nozzle. Conversion of gasoline vehicles to this gaseous fuel, however, may be facilitated by use of a gas fuel adapter. Suitable adapters are available from Garretson Equipment Co., Inc., Mt. Pleasant, Iowa. Also note Garretson U.S. Pat. Nos. 3,974,851; 4,375,798; 4,829,957.

The effluent from combustion of the fuel of this invention is substantially entirely carbon dioxide gas and water vapor, as shown by analyses of effluent from lawnmower and automobile engines fueled with it. Hydrocarbon fragments in any form are conspicuous by their absence, as are all particulates, presumably because of the facility of complete combustion of the simple components of the fuel gas. A possibility of hydrocarbon contamination exists from currently used petroleum-based lubricants, or from loosening of carbonized deposits of formerly used lubricants and fuels, especially in old engines.

Oxides of nitrogen, common in combustion products of gases from fossil fuels or of hydrogen alone, are missing (or minimal) because there is no possible source other than air, and the carbon monoxide content effectively cools and evens out combustion in the engine so as to preclude their generation by intake valve overheating, flashback, or other hyperoxidative characteristic of hydrogen combustion.

Carbon monoxide is not found in the effluent, notwithstanding its content in the fuel itself, because carbon monoxide oxidizes so readily to carbon dioxide. Carbon monoxide in automobile exhaust gases results from insufficient combustion of gasoline hydrocarbons.

Indeed, an internal-combustion engine running on this fuel can be located in an occupied room without harming the occupants, as its operation normally reduces pre-existing concentration of ordinary pollutants in the ambient atmosphere (the combustion air source), so such engine operation cleans the air rather than contaminating it. The distinction between gasoline operation of an internal-combustion engine and its operation on the fuel gas of this invention has to be seen and smelled to be believed—and enjoyed. Effluent analysis by competent objective analysts has confirmed the merits of this fuel.

No unusual materials of construction are needed in apparatus of this invention. The reactor need be only a structurally sound tank, such as steel or other metal, and is preferably grounded. The hood to receive the evolved gases may be separate from or combined with the tank. The magazine to hold and dispense carbon rods also may be made of metal, plastic, or ceramic. The magazine may accommodate any convenient number of rods, conveniently loaded at least partly upright, side-by-side on an inside surface slanting down to an exit directly above the desired electrode-bridging location, so as to be fed by gravity, although automatic feed may be adopted if preferred.

Whereas solid graphite is preferred for block electrodes, the rods may be composed mainly or solely of particulate carbon, preferably without added binder. Both are also generally available for use in welding and other high-temperature environments and/or high-pressure environments requiring chemical inertness.

Both water and carbon are also relatively low-cost inputs. Similarly, the power required to decompose water is readily available at reasonable cost in at least most locations.

The electrical potential applied across the underwater arc is preferably DC (direct-current) rather than AC (alternating current). Conventional welding equipment operates from standard line-power AC (usually 3-phase) input, and yields a DC or AC output, as desired. For present purposes a DC output of at least several dozens of volts across the electrodes is preferred. External rectification of AC is readily accomplished, as in welding apparatus, for example. AC to DC conversion without moving parts and with an improved output may be accomplished according to Luce U.S. Pat. No. 4,870,558.

If a conventional power source is objectionable because dependent upon fossil fuels, part of the electrical power output can be applied to maintain the arc, and a small part can even be stored, as in a battery or a large capacitor, to restart the arc at any time. The chemical energy available by burning the fuel is so much greater than the energy required to maintain the arc as to be economical.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

I claim:

1. Method of operating a combustion engine capable of providing vehicle motive power, comprising the steps of
operating the engine by supplying thereto gaseous non-fossil fuel, combusting the fuel therein with ambient air, emitting substantially only carbon dioxide and water from the engine operation; and
producing as the engine output motive power adapted to move the vehicle when applied thereto, so applying the engine output motive power, and thereby moving the vehicle.

2. Method of operating a combustion engine capable of providing vehicle motive power, comprising the steps of non-electrolytically evolving a non-fossil gaseous fuel on board such a vehicle;
consuming some of the fuel in operating the engine, by combusting the fuel therein with ambient air, emitting substantially only carbon dioxide and water from the engine operation;
producing, as the engine output, motive power adapted to move a vehicle when applied thereto, and so applying the engine output motive power, and thereby moving the vehicle; and
storing on board, for future operation of the engine, evolved fuel surplus to current engine operation.

3. Method of operating wheel-propelled motor vehicles, without producing harmful emissions, comprising the steps of combusting gaseous fuel comprising hydrogen in major part, carbon monoxide in predominant minor part, and non-fossil hydrocarbon in lesser minor part, with air in an internal-combustion engine, while emitting substantially only carbon dioxide and water, and
generating a mechanical output from the engine, and applying the mechanical output to the vehicle so as to propel the vehicle.

4. Method of operating wheel-propelled motor vehicles, without producing harmful emissions, comprising the steps of producing gaseous fuel by operation of an underwater carbon arc, evolving and liquefying the gaseous fuel, storing the fuel in its resulting liquid form preparatory to use, and enabling the liquefied fuel to vaporize before undergoing combustion;
combusting gaseous fuel comprising hydrogen in major part, carbon monoxide in predominant minor part, and organic hydrocarbon in lesser minor part, with air in an internal-combustion engine, while emitting substantially only carbon dioxide and water; and
generating a mechanical output from the engine, and applying the mechanical output to the vehicle so as to propel the vehicle.

5. Apparatus comprising combustion-engine means adapted to produce a mechanical output, and motive means adapted to propel a vehicle in response to said output when provided therewith, and non-fossil gaseous fuel from underwater carbon arcing adapted to be combusted together with ambient air as the engine means emits substantially only carbon dioxide and water.

6. Apparatus comprising
combustion-engine means adapted to produce a mechanical output, and motive means adapted to propel a vehicle in response to said output when provided therewith, and with non-fossil gaseous fuel from underwater carbon arcing to be combusted with ambient air, the engine means emitting substantially only carbon dioxide and water;
wherein the motive means includes electrical generating means responsive to mechanical output from the combustion engine and productive of an electrical output, wheels whose rotation in contact with a supporting surface is adapted to propel the vehicle, and electrically driven motors connected to the wheels, and including mechanical transmission means to connect the mechanical output from the combustion engine to the electrical generating means; and electrical transmission means to connect the electrical output to the motors, and thereby propel the vehicle.

7. Method of fueling a motor vehicle having driving wheels and an internal-combustion engine for providing motive power for the driving wheels, comprising deriving engine-operating fuel by the steps of collecting gas evolved from underwater arcing of graphite electrodes, compressing the same, and supplying it to the engine.

8. Method of fueling a motor vehicle having driving wheels and an internal-combustion engine for providing motive power for the driving wheels, comprising the steps of deriving engine-operating fuel by collecting gas evolved from underwater arcing of graphite electrodes, compressing the same, and supplying it to the internal-combustion engine;

interposing electrical generating means between the internal-combustion engine and the driving wheels; and providing the driving wheels with electrically responsive motive means connected to receive suitable driving electrical output from the electrical generating means.

9. Method according to claim 2, including the steps of liquefying the surplus fuel for storage, and enabling the stored fuel to vaporize subsequently before entering the engine.

10. Method according to claim 9, wherein the fuel comprises hydrogen in major part and carbon monoxide in predominant minor part, and including the step of liquefying the fuel comprising the step of extracting heat by applying liquid coolant to the fuel.

11. Method according to claim 10, wherein the fuel is generated by operating an underwater electrical arc, feeding carbon to the arc, evolving and collecting the gaseous fuel.

12. Method according to claim 3, including applying the mechanical output directly to wheels of the vehicle to propel it.

13. Method according to claim 4, including applying the mechanical output to a motor-generator so as to generate electrical power, and applying the electrical power to propel the vehicle.

14. Method according to claim 13, including providing the wheels with electrical motors responsive to the output electrical power, actuating the motors with the generated electrical power, and thereby moving the vehicle.

15. Apparatus according to claim 5, including on-board means adapted to evolve the fuel gas.

16. Apparatus according to claim 12, wherein the on-board gas-generating means comprises underwater carbon arc means adapted to evolve the gaseous fuel comprising hydrogen in major part, carbon monoxide in predominant minor part, and organic hydrocarbon in lesser minor part.

17. Apparatus according to claim 5, wherein the motive means includes wheels whose rotation in contact with a supporting surface is adapted to propel the vehicle, and including transmission means to connect the mechanical output from the combustion engine to the motive means, and thereby propel the vehicle.

18. Method according to claim 7, wherein the fuel comprises in major part hydrogen derived from non-electrolytic decomposition of water, and in predominant minor part carbon monoxide, derived together in non-electrolytic decomposition of water and carbon.

* * * * *